United States Patent [19]

Oh

[11] Patent Number: 4,746,135
[45] Date of Patent: May 24, 1988

[54] PEDAL CRANK DRIVEN TRICYCLE

[76] Inventor: Myung K. Oh, 9-85, Tuck Eun-Ri, Shin Do-Eup, Koyang-goon, Kyung Gi-Do, Rep. of Korea

[21] Appl. No.: 943,369

[22] Filed: Dec. 18, 1986

[30] Foreign Application Priority Data

Dec. 21, 1985 [KR] Rep. of Korea .................. 17268/85

[51] Int. Cl.$^4$ ............................................. B62M 1/02
[52] U.S. Cl. .................................... 280/262; 280/282; D12/112
[58] Field of Search ................ 280/89, 200, 210, 259, 280/260, 262, 263, 270, 281 R, 222, 253, 256, 1.1 R, 1.11 R, 282; D12/107, 112; 272/33 R, 33 B

[56] References Cited

U.S. PATENT DOCUMENTS

| D. 280,980 | 10/1985 | Oh ..................................... D12/112 |
| 920,382 | 5/1909 | Odle ................................... 280/262 |
| 4,524,987 | 6/1985 | Kim ..................................... 280/204 |

FOREIGN PATENT DOCUMENTS

| 2903528 | 8/1980 | Fed. Rep. of Germany ...... 280/259 |
| 912996 | 8/1946 | France ................................. 280/260 |

Primary Examiner—John A. Pekar
Assistant Examiner—Everett G. Diederiks, Jr.
Attorney, Agent, or Firm—Spencer & Frank

[57] ABSTRACT

A non-motorized tricycle including: a frame having a seat for supporting a rider; a front wheel and two rear wheels; a steering member pivotably supported by the frame and supporting the front wheel; and a crank drive mechanism for rotating the rear wheels and propelling the tricycle, the crank drive mechanism including: a pedal crank rotatably supported by the frame and having crank portions and pedals engageable by the feet of the rider; a bracket secured to, and extending downwardly from, the frame; a auxiliary crank member rotatably mounted in the bracket and having two first crank portions and two second crank portions; a rear axle rotatably mounted to the frame and secured to the rear wheels, the rear axle having two crank portions; two main crank rods articulated between the crank portions of the axle and the first crank portions of the auxiliary crank member; and two auxiliary crank rods articulated between the second crank portions of the auxiliary crank member and the pedal crank; the crank drive mechanism being constructed for causing rotary movement imposed on the pedals by the rider to be converted by the crank member and the axle into rotation of the rear wheels.

13 Claims, 1 Drawing Sheet

PEDAL CRANK DRIVEN TRICYCLE

BACKGROUND OF THE INVENTION

The present invention relates to tricycles, particularly for recreational use by children.

Conventionally, children's tricycles are both steered and propelled via the single front wheel. Considerable power is required to propel such tricycles. Therefore, children, particularly small children, soon tire of pedalling such a tricycle, so that it is not used as frequently as might otherwise be desirable.

There are also tricycles whose foot-operated pedals are linked, via rods, to a crank associated with the rear wheels of the tricycle. Tricycles of this type also require considerable operating power, which makes them difficult for children to use. This is due to a considerable extent to the short length of the rods linking the pedal cranks to the wheel axle cranks.

It has also been proposed to provide a children's tricycle in which the front wheels are steered by means of foot pedals and propulsion is effected by the operation of hand operated levers which are coupled to the rear wheel axle by a crank and chain drive mechanism. Vehicles of this type are disclosed in U.S. Pat. No. 4,524,987 and shown in U.S. Pat. No. Des. 280,980. Since the foot pedals turn with the front wheel, the rider's feet must assume an awkward position during turning. Moreover, if the tricycle should tip over, the rider's feet are likely to impact on the ground, causing injury.

SUMMARY OF THE INVENTION

It is an object of the present invention to provide an improved tricycle which is propelled by foot power and steered by means of the hands and which requires reduced propelling power. As a result, a child will be more likely to use such a tricycle more frequently and for longer periods of time, thereby obtaining the benefits attendant to such use.

The above and other objects are achieved, according to the invention, by a non-motorized tricycle comprising:
a frame having a seat for supporting a rider;
a front wheel and two rear wheels;
steering means pivotably supported by the frame and supporting the front wheels; and
crank drive means for rotating the rear wheels and propelling the tricycle, the crank drive means comprising; a pedal crank rotatably supported by the frame and having crank portions and pedals engageable by the feet of the rider; a bracket secured to, and extending downwardly from, the frame; an auxiliary crank member rotatably mounted in the bracket and having two first crank portions and two second crank portions; a rear axle rotatably mounted to the frame and secured to the rear wheels, the rear axle having two crank portions; two main crank rods articulated between the crank portions of the axle and the first crank portions of the crank member; and two auxiliary crank rods articulated between the second crank portions of the crank member and the pedal crank; the crank drive means being constructed for causing rotary movement imposed on the pedals by the rider to be converted by the crank member and the axle into rotation of the rear wheels.

DESCRIPTION OF THE PREFERRED EMBODIMENTS

Figure 1:
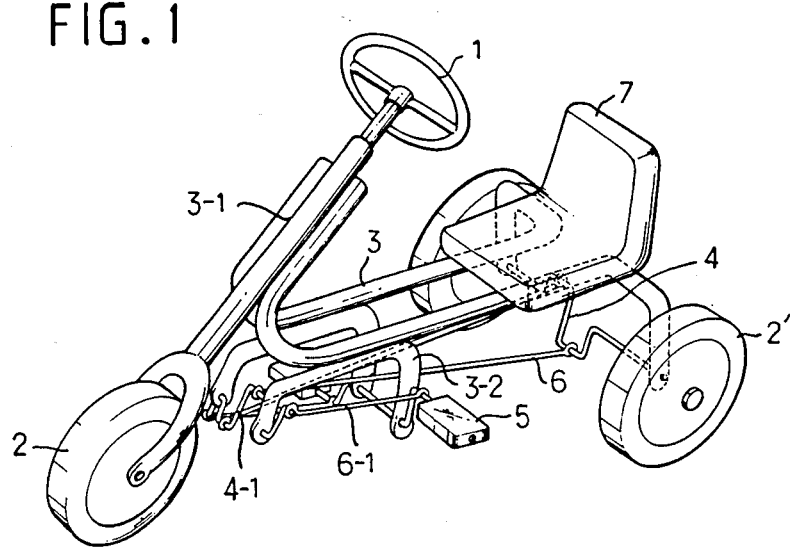
FIG. 1 is a perspective view of a preferred embodiment of a tricycle according to the invention.
Figure 2:
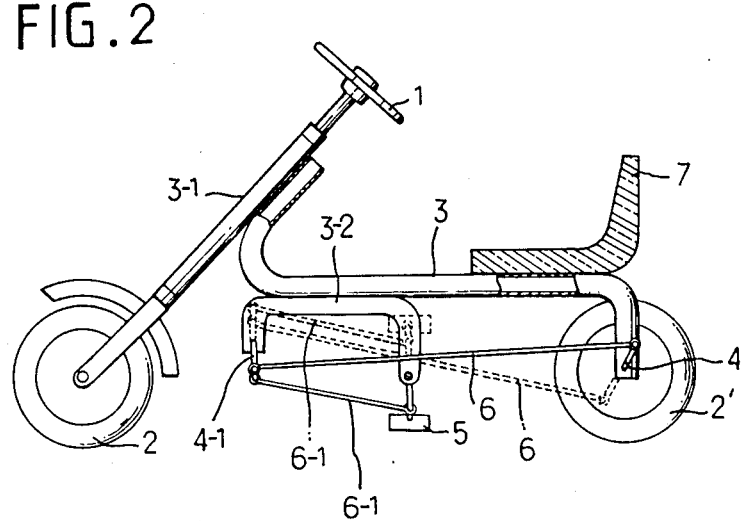
FIG. 2 is, essentially, a cross-sectional view of the tricycle of FIG. 1, with a frame part partly in cross section and certain elements in front of the cross-sectional plane shown in broken lines.

The tricycle shown in FIGS. 1 and 2 includes a frame composed essentially of main tubular members 3, steering post 3-1 and brackets 3-2. Steering post 3-1 houses a steering shaft provided at its lower end with a yoke supporting front wheel 2. In the illustrated embodiment, the steering shaft is surmounted by a steering wheel 1, but handlebars could also be provided. Main tubular members 3 carry a seat 7 which can be secured by screws or nuts and bolts, and can be adjusted in position to adapt to the height of the user and to changes in height as the user grows.

Rear wheels 2' are secured to a rear axle 4 which is rotatably mounted in the frame. Axle 4 has two crank portions which extend in respective diametrically opposite directions from the axis of rotation of axle 4.

A conventional pedal crank 5 provided with foot pedals is rotatably mounted in brackets 3-2 and is linked to the crank portions of axle 4 in order to drive rear wheels 2'.

According to the invention, this linkage is constituted by: an auxiliary crank shaft, or member, 4-1 rotatably mounted in brackets 3-2, at the front end thereof, and having four crank portions; two crank rods 6 connected between the two crank portions of axle 4 and two of the crank portions of member 4-1; and two auxiliary crank rods 6-1 connected between the other two crank portions of member 4-1 and pedal crank 5. Rotation of pedal crank 5 rotates member 4-1, which, in turn, rotates axle 4 and rear wheels 2'.

Auxiliary crank shaft 4-1 and rods 6-1 operate according to the principle of levers, providing suitable driving force with relatively low power input. In the illustrated embodiment, the crank arms of member 4-1 connected to rods 6-1 are slightly longer than those connected to rods 6.

According to a further feature of the invention, the axis of post 3-1, i.e. the pivot axis of the steering shaft, forms an angle of no more than 60° to the horizontal.

If desired, front wheel 2 can be associated with a fender, as shown in FIG. 2, secured to the yoke which supports wheel 2.

It will be understood that the above description of the present invention is susceptible to various modifications, changes and adaptations, and the same are intended to be comprehended within the meaning and range of equivalents of the appended claims.

The present disclosure relates to the subject matter disclosed in Korean Application No. 17268/85 of Dec. 21st, 1985, the entire specification of which is incorporated herein by reference.

What is claimed is:
1. A non-motorized tricycle comprising:
a frame having a seat for supporting a rider;
a front wheel ahd two rear wheels;
steering means pivotably supported by said frame and supporting said front wheel; and crank drive means for rotating said rear wheels and propelling said tricycle, said crank drive means comprising; a pedal crank rotatably supported by said frame and having crank portions and pedals engageable by the feet of the rider; at least one bracket secured to, and extending downwardly from, said frame; an auxiliary crank member rotatably mounted in said bracket and having two first crank portions and two second crank portions; a rear axle rotatably mounted to said frame and secured to said rear wheels, said rear axle having two crank portions; two main crank rods articulated between said crank portions of said axle and said first crank portions of said auxiliary crank member; and two auxiliary crank rods articulated between said second crank portions of said auxiliary crank member and said pedal crank whereby said crank drive means causes rotary movement imposed on said pedals by the rider to be converted by said crank member and said axle into rotation of said rear wheels.

2. A tricycle as defined in claim 1 wherein said steering means are constructed to pivot relative to said frame about an axis which, when said tricycle is supported by a flat surface, forms an angle of no greater than 60° relative to the surface.

3. A tricycle as defined in claim 2 wherein said steering means comprise a steering shaft pivotally mounted in said frame and having an upper end and a lower end, wheel support means supporting said front wheel and fixed to said lower end of said steering shaft, and a steering device fixed to said upper end of said steering shaft.

4. A non-motorized tricycle comprising:
a frame having a seat for supporting a rider;
a front wheel and two rear wheels;
steering means pivotably supported by said frame and supporting said front wheel; and
crank drive means for rotating said rear wheels and propelling said tricycle, said crank drive means comprising:
a pedal crank rotatably supported by said frame and having crank portions and pedals engageable by the feet of the rider;
at least one bracket secured to, and extending downwardly from, said frame;
a rear axle rotatably mounted to said frame and secured to said rear wheels, said rear axle having two crank portions;
an auxiliary crank member rotatably mounted in said bracket and having two first crank portions and two second crank portions, said pedal crank being located between said auxiliary crank member and said rear axle;
two main crank rods articulated between said crank portions of said axle and said first crank portions of said auxiliary crank member; and
two auxiliary crank rods articulated between said second crank portions of said crank auxiliary member and said pedal crank, whereby said crank drive means causes rotary movement imposed on said pedals by the rider to be converted by said crank member and said axle into rotation of said rear wheels.

5. A tricycle as defined in claim 4 wherein said pedal crank is rotatably mounted in said bracket.

6. A tricycle as defined in claim 4 wherein said main crank rods have a length which is greater than the distance between said pedal crank and said rear axle.

7. A tricycle as defined in claim 4 wherein said steering means are constructed to pivot relative to said frame about an axis which, when said tricycle is supported by a flat surface, forms an angle of no greater than 60° relative to the surface.

8. A tricycle as defined in claim 7 wherein said steering means comprise a steering shaft pivotable mounted in said frame and having an upper end and a lower end, wheel support means supporting said front wheel and fixed to said lower end of said steering shaft, and a steering device fixed to said upper end of said steering shaft.

9. A non-motorized tricycle comprising:
a frame having a seat for supporting a rider;
a front wheel and two rear wheels;
steering means pivotably supported by said frame and supporting said front wheel; and
crank drive means for rotating said rear wheels and propelling said tricycle, said crank drive means comprising;
a pedal crank rotatably supported by said frame and having crank portions and pedals engageable by the feet of the rider;
at least one bracket secured to, and extending downwardly from, said frame;
an auxiliary crank member rotatably mounted in said bracket and having two first crank portions and two second crank portions;
a rear axle rotatably mounted to said frame and secured to said rear wheels, said rear axle having two crank portions;
two main crank rods articulated between said crank portions of said axle and said first crank portions of said auxiliary crank member, said main crank rods having a length which is greater than the distance between said pedal crank and said rear axle; and
two auxiliary crank rods articulated between said second crank protions of said auxiliary crank member and said pedal crank, whereby said crank drive means causes rotary movement imposed on said pedals by the rider to be converted by said crank member and said axle into rotation of said rear wheels.

10. A tricycle as defined in claim 9 wherein said pedal crank is located between said auxiliary crank member and said rear axle.

11. A tricycle as defined in claim 9 wherein said steering means are constructed to pivot relative to said frame about an axis which, when said tricycle is supported by a flat surface, forms an angle of no greater than 60° relative to the surface.

12. A tricycle as defined in claim 11 wherein said steering means comprise a steering shaft pivotably mounted in said frame and having an upper end and a lower end, wheel support means supporting said front wheel and fixed to said lower end of said steering shaft, and a steering device fixed to said upper end of said steering shaft.

13. A tricycle as defined in claim 9 wherein said pedal crank is rotatably mounted in said bracket.

* * * * *